(12) United States Patent
Cerutti et al.

(10) Patent No.: US 12,512,778 B2
(45) Date of Patent: Dec. 30, 2025

(54) POWER CIRCUIT HAVING SAFETY FUNCTION AND METHOD FOR CONTROLLING THE SAME

(71) Applicant: Monolithic Power Systems, Inc., Kirkland, WA (US)

(72) Inventors: Cristian Cerutti, Voghera (IT); Christophe Vaucourt, Bas-Rhin (FR)

(73) Assignee: Monolithic Power Systems, Inc., Kirkland, WA (US)

( * ) Notice: Subject to any disclaimer, the term of this patent is extended or adjusted under 35 U.S.C. 154(b) by 236 days.

(21) Appl. No.: 18/328,471

(22) Filed: Jun. 2, 2023

(65) Prior Publication Data

US 2023/0318511 A1    Oct. 5, 2023

(51) Int. Cl.
*H02P 29/02* (2016.01)
*B60R 16/023* (2006.01)
*H02M 1/088* (2006.01)
*H02M 3/158* (2006.01)

(52) U.S. Cl.
CPC .......... *H02P 29/02* (2013.01); *B60R 16/0231* (2013.01); *H02M 1/088* (2013.01); *H02M 3/158* (2013.01)

(58) Field of Classification Search
CPC ..... H02P 29/02; B60R 16/0231; B60R 16/03; H02M 1/088; H02M 3/158; H02H 3/087
USPC ....................................................... 318/445
See application file for complete search history.

(56) References Cited

U.S. PATENT DOCUMENTS

| | | | |
|---|---|---|---|
| 10,389,222 B2* | 8/2019 | Xue | H02M 3/158 |
| 2015/0311692 A1* | 10/2015 | Hiyama | H02M 1/08 |
| | | | 361/31 |
| 2022/0332542 A1* | 10/2022 | Herkel | B66B 5/02 |

OTHER PUBLICATIONS

Garbossa (DE 102014115800 A1). Electronic Security Path (Year: 2015).*
Badder et al. (CN 107896049 B) Half-bridge Circuit, Half-bridge Circuit Package and Method for Constructing Half-bridge Circuit Package (Year: 2020).*

* cited by examiner

*Primary Examiner* — Jorge L Carrasquillo
(74) *Attorney, Agent, or Firm* — Perkins Coie LLP (57) ABSTRACT

A power circuit includes a first power switch and a control unit. The control circuit is configured to provide a first driving signal to a control terminal of the first power switch, and the first power switch is turned on and off in response to the first driving signal. The power circuit further includes an input pin configured to receive an input voltage signal, an output pin configured to provide an output voltage signal, at least one control pin configured to receive at least one control signal, and a first safety pin coupled to the control terminal of the first power switch. The first safety pin is configured to receive a first safety signal, and the first power switch is controlled in response to the first safety signal.

17 Claims, 6 Drawing Sheets

POWER CIRCUIT HAVING SAFETY FUNCTION AND METHOD FOR CONTROLLING THE SAME

TECHNICAL FIELD

The present disclosure relates generally to electronic circuits, and more particularly but not exclusively to power circuits having a safety function.

BACKGROUND OF THE INVENTION

Modern vehicles are equipped with a variety of safety systems such as advanced driver-assistance system (ADAS) to assist drivers while driving. As more electronic devices and systems are integrated into vehicles to control the vehicles, the requirement of the reliability and functional safety of the electronic components and subsystems have increased. For example, ISO 26262 defines the functional safety standard, Automotive Safety Integrity Level (ASIL), to avoid unreasonable residual risk of electronic component and system failure. Based on the severity (the type of injuries to the driver and passengers), the exposure (how often the vehicle is exposed to the hazard), and the controllability, different automotive components may have various ASIL classifications from the highest degree of automotive hazard (i.e., ASIL-D) to the lowest degree (i.e., ASIL-A), and the level where there are no safety requirements (i.e., Quality management (QM)). The failure of an on-board equipment, such as the vehicle's steering and braking systems, can cause danger or injuries to the drivers and passengers. As a result, it is necessary to define certain vehicle/system safety requirements, and also define the proper automotive electronics requirement.

One request under ASIL-D rating is to safely turn off the power supply to the automotive equipment. In order to ensure the safe shutdown operation, a relay or an isolation circuit is often used to disconnect the connection between the power circuit and the on-board equipment when malfunctioning. Another way is to monitor the operation of the power circuit and on-board equipment and to perform shutdown operation when an emergency or failure occurs. However, these features need additional control circuit elements and thus increases the circuit size. Also, it increases design complexity. Therefore, it is desirable to provide a robust and efficient integrated circuit (IC) with a safety function to ensure the safe operation of the automotive equipment.

SUMMARY OF THE INVENTION

According to an embodiment of the present disclosure, a power circuit is provided. The power circuit includes a first power switch and a control unit. The control circuit is configured to provide a first driving signal to a control terminal of the first power switch, and the first power switch is turned on and off in response to the first driving signal. The power circuit further includes an input pin configured to receive an input voltage signal, an output pin configured to provide an output voltage signal, at least one control pin configured to receive at least one control signal, and a first safety pin coupled to the control terminal of the first power switch. The first safety pin is configured to receive a first safety signal, and the first power switch is controlled in response to the first safety signal.

According to another embodiment of the present disclosure, a method for controlling a power circuit is provided. The power circuit includes a first power switch and a control circuit. The method includes the following actions. An input voltage signal and at least one control signal are received. A first driving signal is provided to a control terminal of the first power switch in response to the input voltage signal and the at least one control signal, where the first power switch is turned on and off in response to the first driving signal. A first safety signal is received by the control terminal of the first power switch, and the first power switch is controlled in response to the first safety signal. An output voltage signal is provided in response to the first driving signal and the first safety signal.

According to yet another embodiment of the present disclosure, a safety function circuit for a power circuit is provided. The power circuit includes a first power switch and a control circuit. The safety function circuit includes an input pin configured to receive a safety command. The safety function circuit further includes a protection circuit configured to generate a safety signal in response to the safety command, and the safety signal is a control signal of the power switch. The safety function circuit further includes an output pin configured to provide the safety signal to a control terminal of the power switch, and the power switch is controlled in response to the safety signal.

BRIEF DESCRIPTION OF THE DRAWINGS

The present disclosure can be further understood with reference to following detailed description and appended drawings, wherein like elements are provided with like reference numerals. These drawings are only for illustration purpose, thus may only show part of the devices and are not necessarily drawn to scale.

DETAILED DESCRIPTION

Various embodiments of the present disclosure will now be described. In the following description, some specific details, such as example circuits and example values for these circuit components, are included to provide a thorough understanding of embodiments. One skilled in the relevant art will recognize, however, that the present disclosure can be practiced without one or more specific details, or with other methods, components, materials, etc. In other instances, well-known structures, materials, processes or operations are not shown or described in detail to avoid obscuring aspects of the present disclosure.

Throughout the specification and claims, the phrases "in one embodiment", "in some embodiments", "in one implementation", and "in some implementations" as used includes both combinations and sub-combinations of various features described herein as well as variations and modifications thereof. These phrases used herein does not necessarily refer to the same embodiment, although it may. Those skilled in the art should understand that the meanings of the terms identified above do not necessarily limit the terms, but merely provide illustrative examples for the terms. It is noted that when an element is "connected to" or "coupled to" the other element, it means that the element is directly connected to or coupled to the other element, or indirectly connected to or coupled to the other element via another element. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
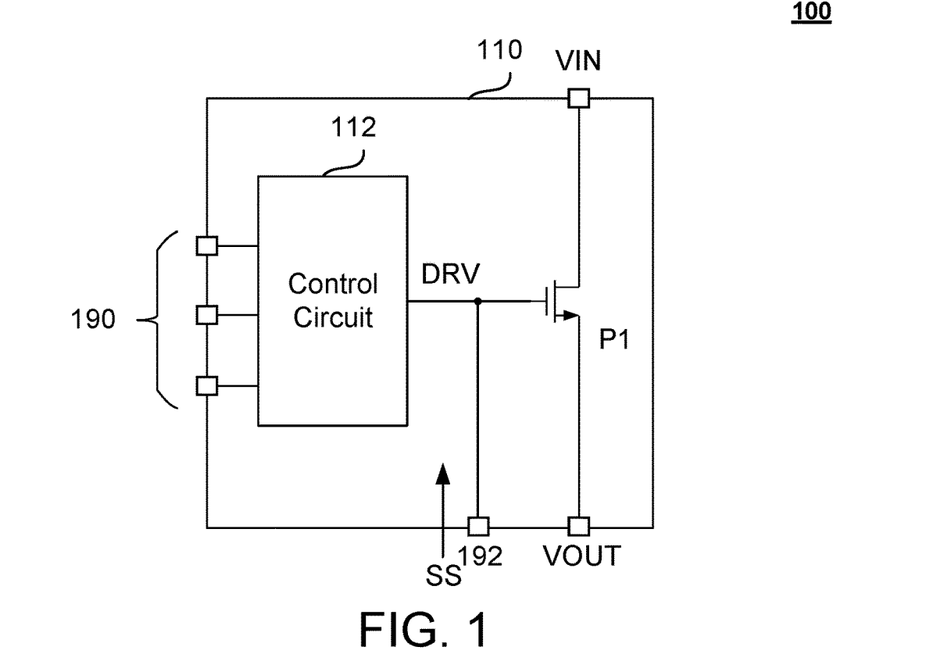
FIG. 1 is a schematic block diagram of a power circuit in accordance with an embodiment of the present disclosure.

FIG. 1 is a schematic block diagram of a power circuit 100 in accordance with an embodiment of the present disclosure. The power circuit 100 includes at least a power switch P1 and a control circuit 112. In one embodiment, the power circuit may be configured in any suitable topology, such as step-down converter, step-up converter, Flyback converter, AC-DC converter, load switch, motor driver, and solenoid driver.

The power switch P1 has a first terminal, a second terminal and a control terminal. For example, the power switch P1 may be a transistor, e.g., a Bipolar Junction Transistor (BJT), a Metal-Oxide-Semiconductor Field-Effect Transistor (MOSFET), an Insulated-Gate Bipolar Transistor (IGBT), or other controllable switches. In one embodiment, the power switch P1 is an NMOS having a source terminal, a drain terminal and a gate terminal.

The control circuit 112 is configured to provide a driving signal DRV to the control terminal (e.g., gate) of the power switch P1, and the power switch P1 is turned on and turned off the in response to the driving signal DRV.

In this embodiment, the power circuit 100 includes an integrated circuit (IC) 110 having multiple pins. For instance, the power circuit 100 includes an input pin Vin configured to receive an input voltage signal, and an output pin Vout configured to provide an output voltage signal. The power circuit 100 includes at least one control pin 190 configured to receive at least one control signal such as PWM signals, enable signals, monitor signals, and sensing signals. The at least one control pin 190 is coupled to the control circuit 112.

The power circuit 100 further includes a safety pin 192 coupled to the control terminal (e.g., gate) of the power switch P1, and the safety pin 192 is configured to receive a safety signal SS. The power switch P1 is controlled in response to the safety signal. For instance, when a critical event occurs, a safety signal SS is provided to the control terminal (e.g., gate) of the power switch P1 via the safety pin 192, and the power switch P1 is turned off. By providing the safety signal SS through the safety pin 192, the IC 110 provides a safety shutdown function to discharge the gate of the power switch P1. In other words, the IC 110 provides additional path independent to the traditional control loop circuit of the power switch P1 to turn off the power switch P1. Thus, even if the control circuit 112 of the IC 110 fails, the safety shutdown function is able to turn off the power switch P1 via the safety pin 192, and guarantee the safety turn-off of the power circuit 100. Through the safety pin 192, the IC 110 allows external circuits to directly control the power switch P1 regardless of the state of IC 110 (e.g., normal operation or malfunctioning behavior).

Figure 2:
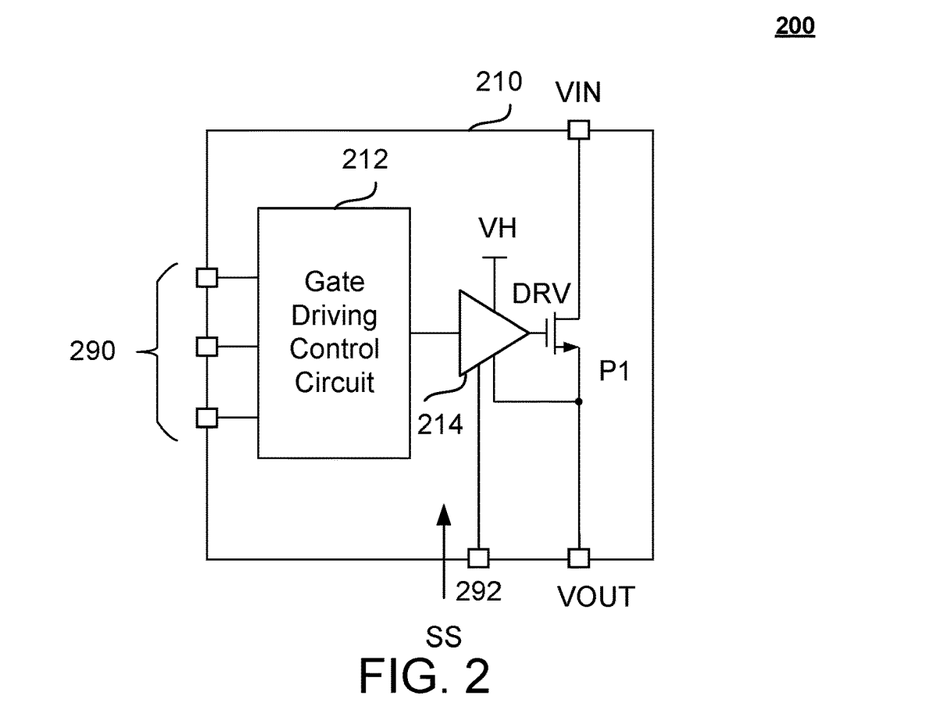
FIG. 2 is a schematic block diagram of a power circuit in accordance with another embodiment of the present disclosure.

FIG. 2 is a schematic block diagram of a power circuit 200 in accordance with another embodiment of the present disclosure. In this embodiment, the control circuit of the IC 210 includes a gate driving control circuit 212 and a driver 214. The gate driving control circuit 212 is coupled to the control pins 290, and configured to provide a PWM control signal in response to the driver 214. The driver 214 is configured to provide the driving signal DRV to the control terminal (e.g., gate) of the power switch P1 in response to the PWM control signal. As shown in FIG. 2, the safety pin 292 is coupled to the control terminal (e.g., gate) of the power switch P1 via the driver DRV. That is, the driver 214 provides the driving signal DRV to control the power switch P1 in response to the safety signal SS.

Figure 3:
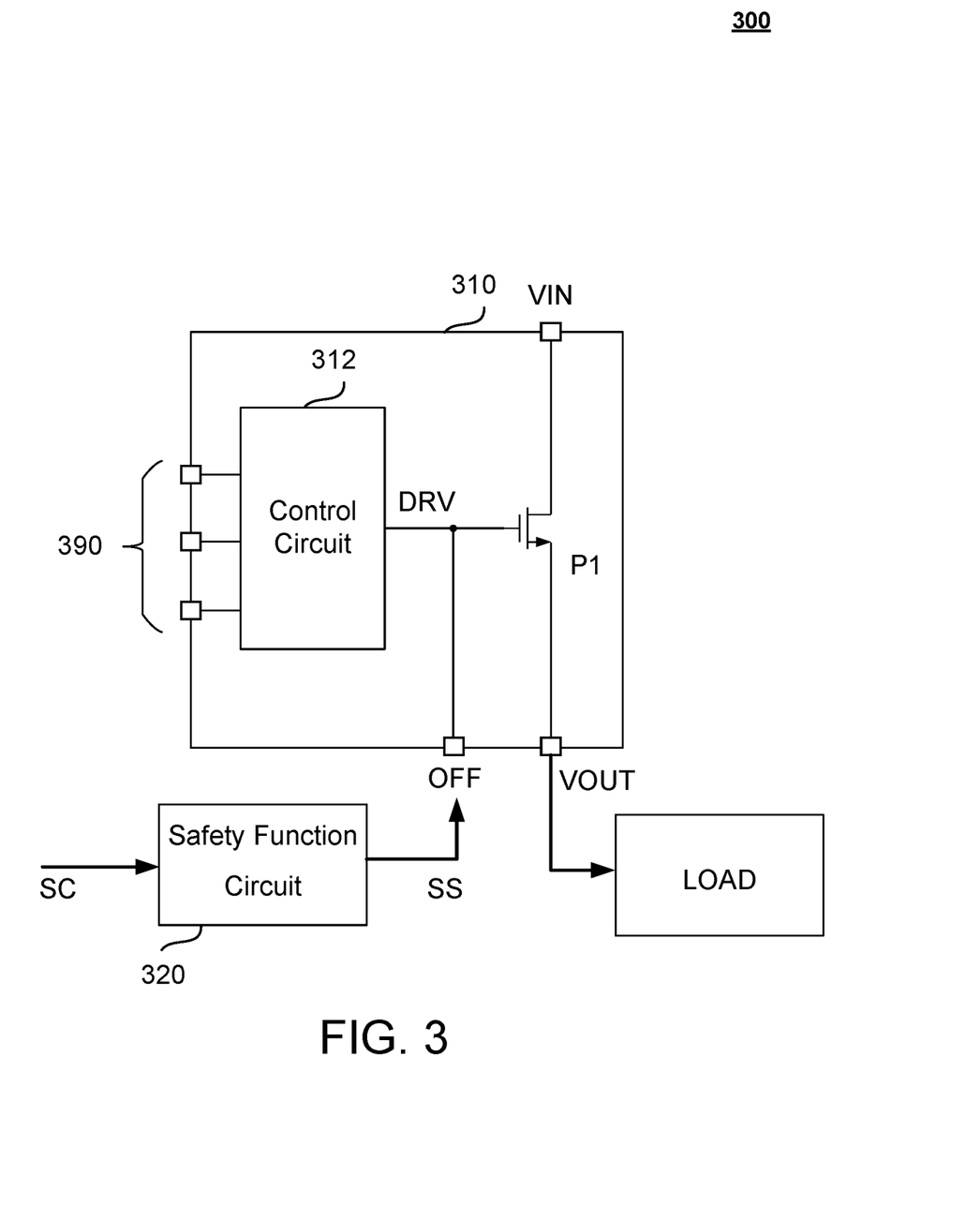
FIG. 3 is a schematic block diagram of a power circuit with a safety function circuit in accordance with an embodiment of the present disclosure.

In one embodiment, in order to meet the automotive safety standard requirement of a load device, the power circuit adjusts the output voltage signal to the load device in response to the safety signal. In one implementation, the safety standard is defined by an Automotive Safety Integrity Level (ASIL). The determination of the ASIL rating may be performed by the Electronic Control Unit (ECU) or other system controller. FIG. 3 is a schematic block diagram of a power circuit 300 with a safety function circuit 320 in accordance with an embodiment of the present disclosure. In this embodiment, the power circuit 300 includes an IC 310 and a safety function circuit 320. When the ASIL-D requirement of a load device is determined, the ECU or other system controller (not shown) issues a safety command to shut down the load device in response to the ASIL-D rating. In this embodiment, the safety function circuit 320 is configured to receive the safety command SC and provide the safety signal SS in response to the safety command SC. In one implementation, the safety command SC includes a PWM signal indicating an OFF state. In another implementation, the safety command SC includes an enable signal indicating an OFF state. For instance, the safety signal SS is a low voltage level signal to turn off an NMOS switch.

In some embodiments, instead of shutting down the load device or turning off the power switches, the IC 310 adjusts the output voltage signal to control the operation of the load device to meet the ASIL requirement. Specifically, the safety function circuit 320 receives the safety command SC and provides the safety signal to the control circuit 312 or the control terminal of the power switch P1. As a result, the power circuit 310 controls the safety operation of the load, for example, by adjusting the duty ratio of the PWM signal given to the motor.

In another implementation, the automotive safety standard is defined by ISO 13849. ISO13849 specifies a methodology and provides related requirements, recommendations and guidance for the design and integration of safety-related parts of control systems that perform safety functions, including the design of software. In one embodiment, the IC 310 adjusts the output voltage signal to control the operation of the load device to meet the ISO 13849 standard. However, the present invention is not limited thereto. In some implementations, the IC 310 adjusts the output voltage signal to control the operation of the load device to meet other automotive safety standards.

In one embodiment, the control circuit 312 and the safety function circuit 320 are integrated on different dies. Since the safety function circuit 320 is isolated or located outside of the IC 310, the safety function circuit 320 is independent to the control loop of the power switch P1. Therefore, even if malfunction occurs on the control circuit 312, the safety function circuit 320 is able to operate normally to safely discharge the gate of the power switch P1.

In some embodiments, the safety function circuit 320 further monitors the safety operation. For instance, the safety function circuit 320 monitors the output voltage signal to make sure the power switch PF1 is turned off or safely discharged. In other examples, the safety function circuit 320 further detects the malfunctioning behaviors or hardware failures of the IC 310. In some implementations, the safety function circuit 320 monitors the load conditions to make sure the load device is operated properly.

Figure 4:
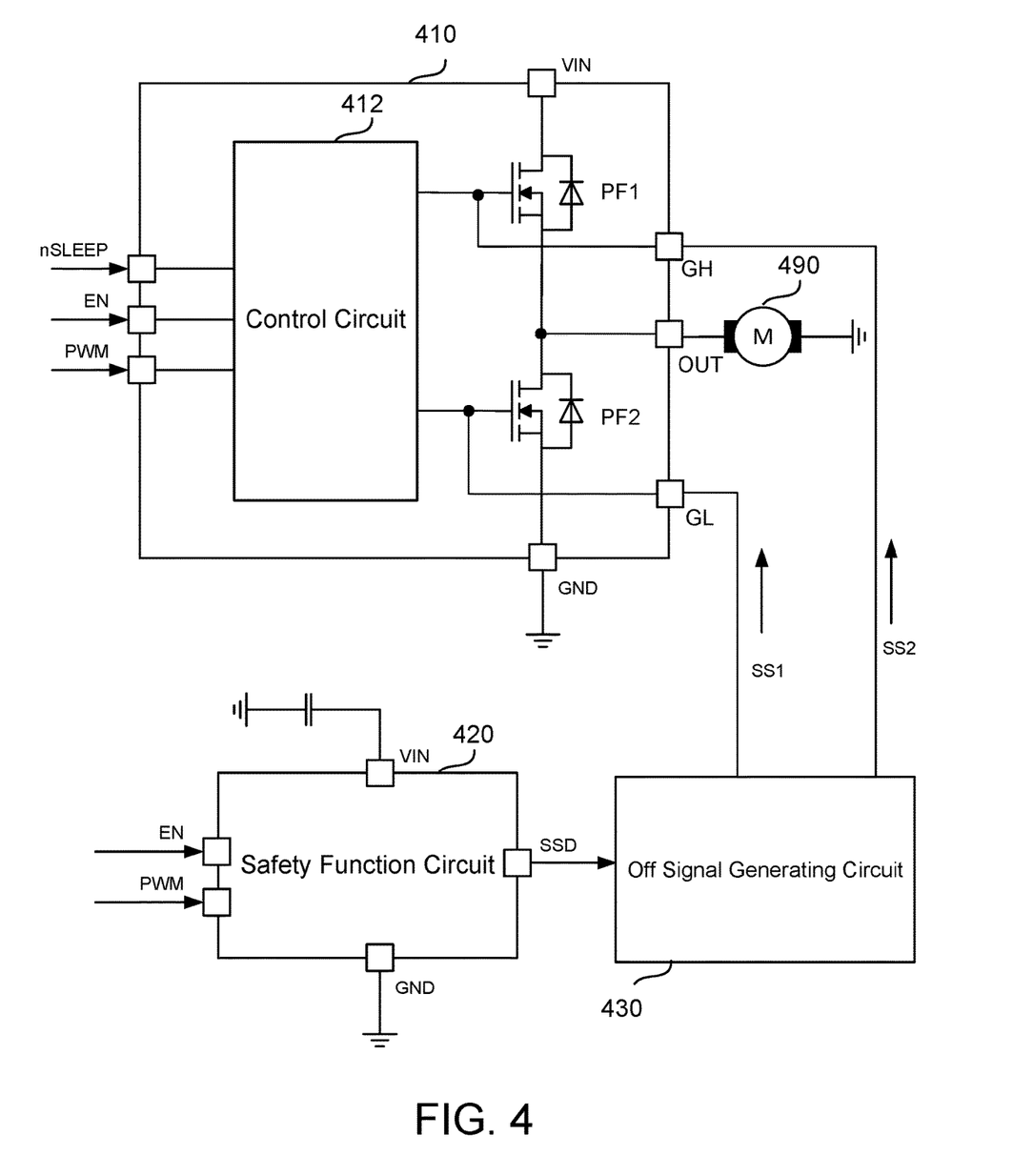
FIG. 4 is a schematic block diagram of a motor driver IC for controlling a motor in accordance with an embodiment of the present disclosure.

FIG. 4 is a schematic block diagram of a motor driver IC 410 for controlling a motor 490 in accordance with an embodiment of the present disclosure. In this embodiment, the motor driver IC 410 including a control circuit 412 and two power switches PF1 and PF2. As shown in FIG. 4, the motor driver IC 410 includes multiple control pins (e.g., nSleep, EN, PWM) for receiving control signals from a system controller (not shown). The control circuit 412 is configured to receive the control signals via the control pins, and provide the respective driving signals to the control terminals (e.g., gate) of the power switches PF1 and PF2 to alternatively turn on and off the power switches PF1 and PF2. The power switches PF1 and PF2 are serially connected between the input pin VIN and the ground pin GND. The motor driver IC provide the output voltage signal to the motor 490 via the output pin VOUT.

The motor driver IC 410 further includes a safety pin GH coupled to the control terminal of the power switch PF1 and a safety pin GL coupled to the control terminal of the power switch PF2. In one implementation, the motor driver IC is a monolithic IC. In another implementation, the control circuit 412 and the power switches PF1 and PF2 are integrated on different dies based on the switch devices. For example, the control circuit 412 is on the Si die and the power switches PF1 and PF2 are on SiC or GAN die. In some implementations, the power switches PF1 and PF2 are on Si die.

When a load motor 490 is determined to be the ASIL-D level, the system controller (not shown) issues a safety command (e.g., control signals EN, PWM) to the control circuit 412 and the safety function circuit 420. In one embodiment, the safety function circuit 420 is an IC. The power circuit 400 further includes an off signal generating circuit 430. The off signal generating circuit 430 configured to receive a safety shutdown signal SSD from the safety function circuit 420, and provide the safety signals SS1 and SS2 respectively to the control terminals of the power switches PF1 and PF2 to turn off the power switches PF1 and PF2. Thus, by turning off the power switches PF1 and PF2, unintended motor rotation, motor rotation in opposite direction, excessive motor rotation speed, or excessive motor torque generation may be avoided.

Figure 5:
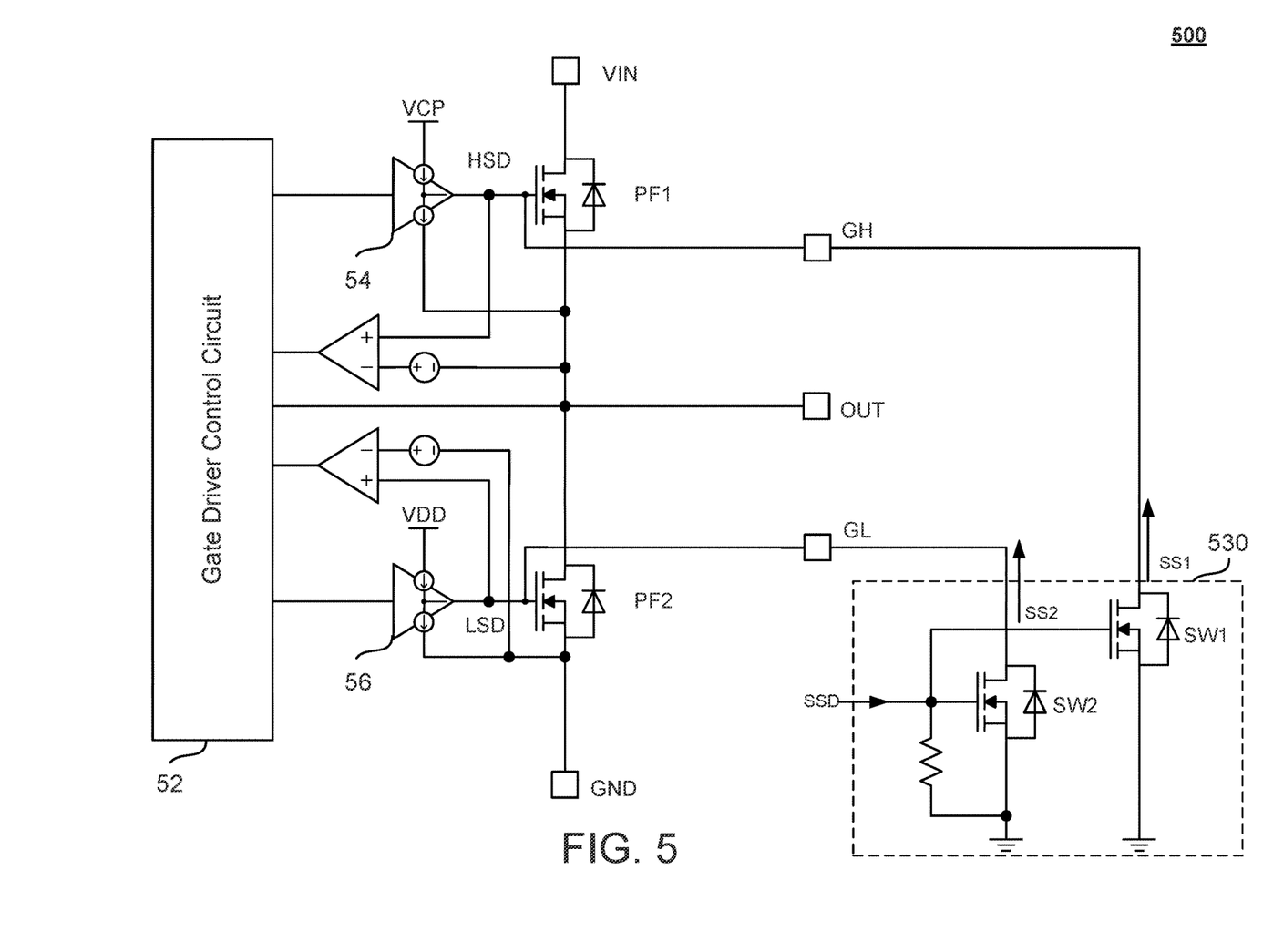
FIG. 5 is a schematic circuit diagram of an off signal generating circuit in accordance with an embodiment of the present disclosure.

FIG. 5 is a schematic circuit diagram 500 of an off signal generating circuit 530 in accordance with an embodiment of the present disclosure. As shown in FIG. 5, the output stage of the motor driver IC includes a gate driver control circuit 52, two drivers 54 and 56, and two power switches PF1 and PF2. In one embodiment, the off signal generating circuit 530 includes two switches SW1 and SW2 to generate the two low voltage level signals as the safety signals SS1 and SS2. Specifically, the safety shutdown signal SSD is received via the control terminal of the switch SW1, and the first terminal (e.g., drain) of the switch SW1 is coupled to the control terminal of the power switch PF1, and the second terminal (e.g., source) of the switch SW1 is coupled to a reference voltage level (e.g., GND). That is, when a safety shutdown signal SSD (e.g., a high voltage level) is received, the switch SW1 is turned on and thus the safety signal SS1 having a reference voltage level (e.g., a low voltage level) is provided to the control terminal (e.g., gate) of the power switch PF1 to turn off the power switch PF1. Similarly, the safety shutdown signal SSD is received via the control terminal of the switch SW2, and the first terminal (e.g., drain) of the switch SW2 is coupled to the control terminal of the power switch PF2, and the second terminal (e.g., source) of the switch SW2 is coupled to a reference voltage level (e.g., GND). Thus, when a safety shutdown signal SSD (e.g., a high voltage level) is received, the switch SW2 is turned on and thus the safety signal SS2 having a reference voltage level (e.g., a low voltage level) is provided to the control terminal (e.g., gate) of the power switch PF2 to turn off the power switch PF2.

In one embodiment, the power switches PF1 and PF2 are NMOS, and therefore the safety signals SS1 and SS2 are low voltage level signals. However, the present invention is not limited thereto. In some other embodiments, according to the structures types of the power switches PF1 and PF2, the off signal generating circuit 430 may generate different voltage levels as the safety signals SS1 and SS2 to turn off the power switches PF1 and PF2. It should be understood that the off signal generating circuit 430 is a circuit for generating two signals to turn off the power switches PF1 and PF2. Furthermore, according to the type (e.g., voltage level) of the safety shutdown signal SSD, the off signal generating circuit 530 may have different circuit structures to generate the safety signals SS1 and SS2 to turn off the power switches PF1 and PF2.

In some embodiments, the gate-to-source voltage (Vgs) of the power switch PF1 and the gate-to-source voltage (Vgs) of the power switch PF2 are monitored and provided to the gate driver control circuit 52, and the gate driver control circuit 52 determines whether the power switches PF1 and PF2 are turned off. If the power switches PF1 and PF2 are not turned off, the gate driver control circuit 52 controls the PWM control signals to the drivers 54 and 56 to turn off the power switches PF1 and PF2.

In some other embodiments, the gate-to-source voltage (Vgs) of the power switch PF1 and the gate-to-source voltage (Vgs) of the power switch PF2 are monitored and provided to the safety function circuit 420 as shown in FIG. 4 (e.g., via the GH pin and OUT pin, and GL pin and GND pin), and safety function circuit 420 determines whether the power switches PF1 and PF2 are turned off. If the power switches PF1 and PF2 are not turned off, the safety function circuit 420 controls the safety shutdown signal SSD provided to the off signal generating circuit 430, and the off signal generating circuit 430 provides the safety signals SS1 and SS2 to turn off the power switches PF1 and PF2.

Figure 6:
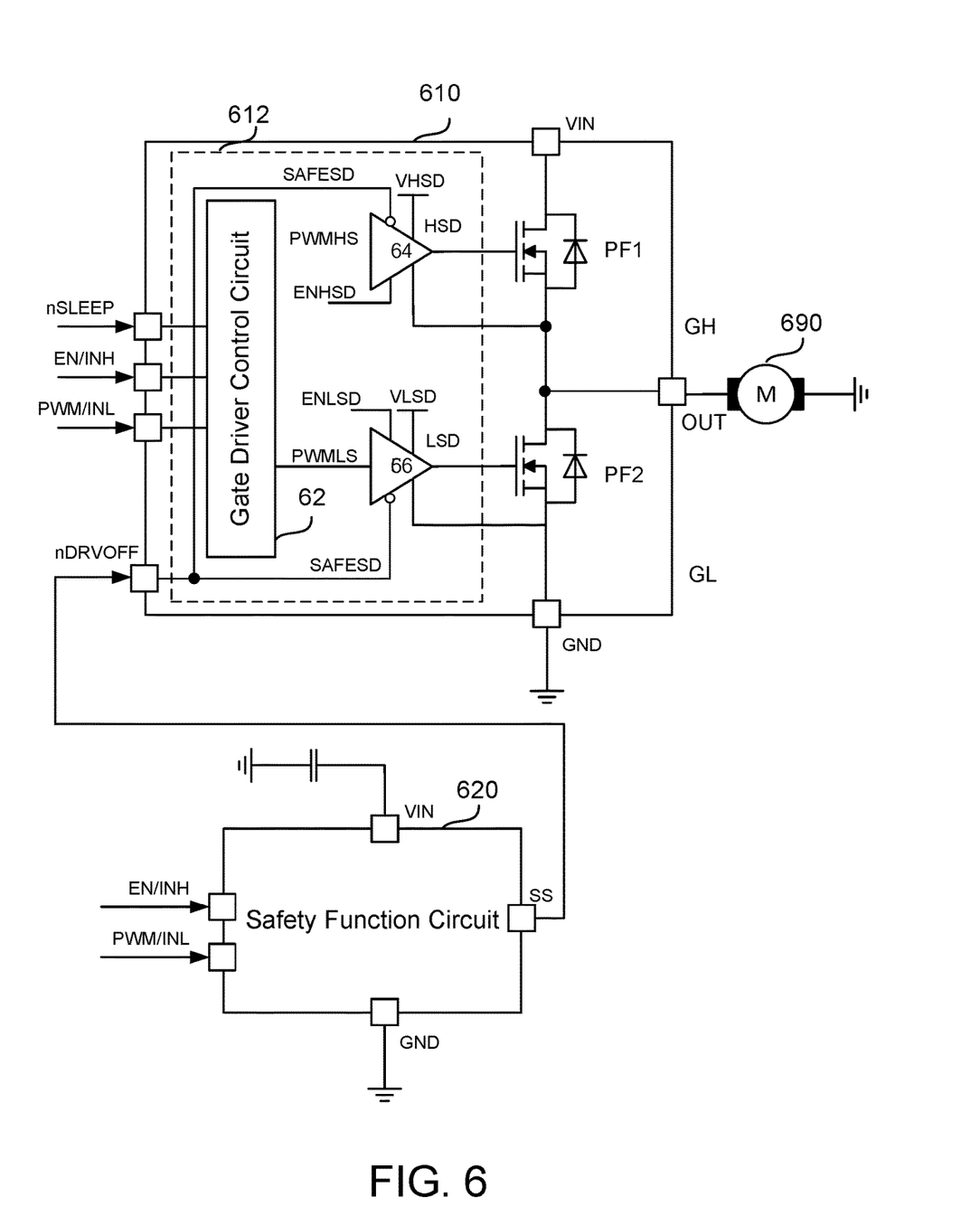
FIG. 6 is a schematic block diagram of a motor driver IC for controlling a motor in accordance with another embodiment of the present disclosure.

FIG. 6 is a schematic block diagram of a motor driver IC 610 for controlling a motor 690 in accordance with another embodiment of the present disclosure. In this embodiment, the control circuit 612 includes a gate driver control circuit 62, and two drivers 64 and 66. As shown in FIG. 6, the safety pin nDRVOFF is coupled to the control terminal of the power switches PF1 and PF2 via the two drivers 64 and 66. The safety function circuit 620 provides the safety signal SAFESD to the drivers 64 and 66 via the safety pin nDRVOFF. The driver 54 provides the driving signals HSD to turn off the power switch PF1 in response to the safety signal SAFESD, and the driver 56 provides the driving signals LSD to turn off the power switch PF2 in response to the safety signal SAFESD.

Figure 7:
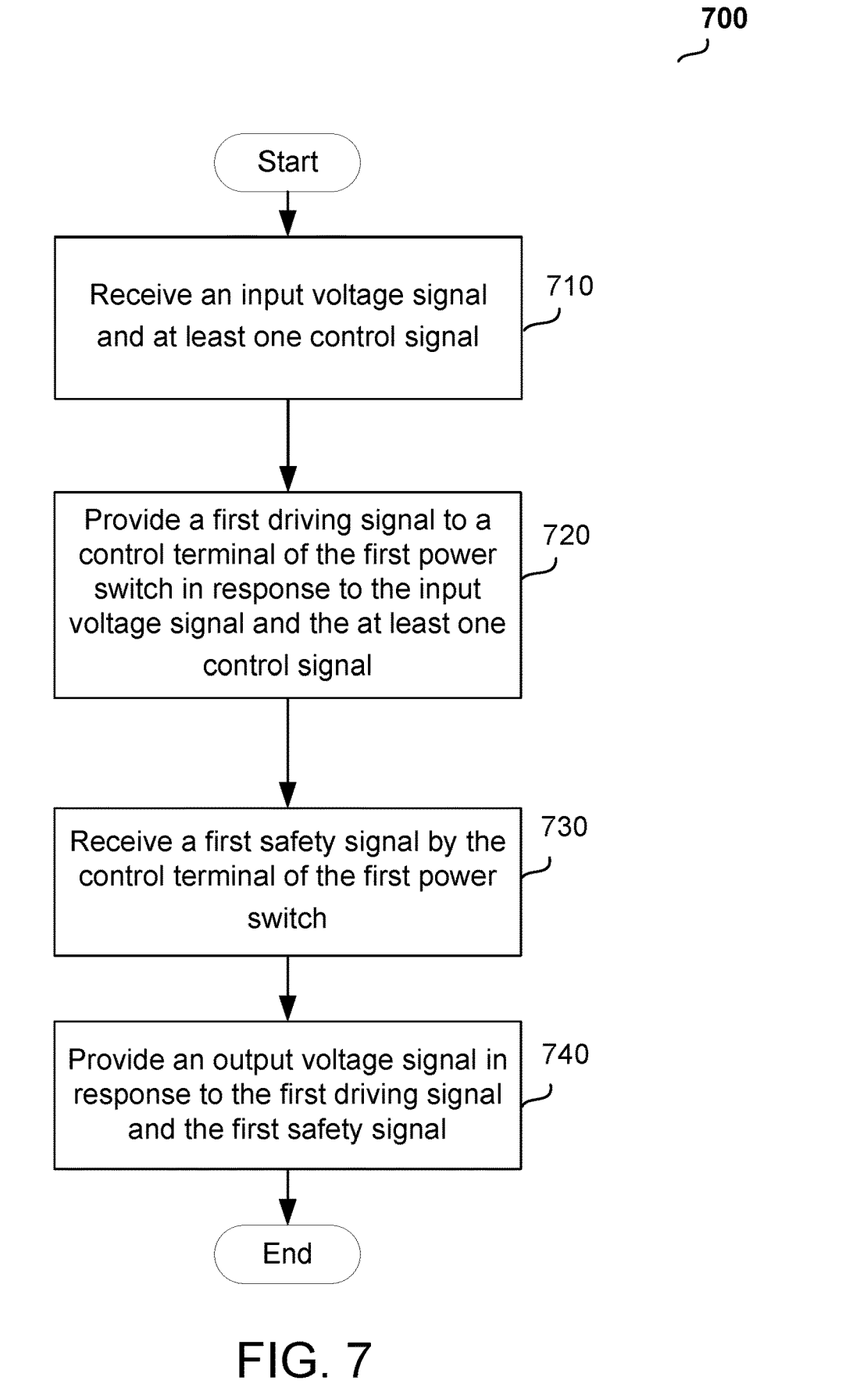
FIG. 7 is a flowchart of a method for controlling a power circuit in accordance with an embodiment of the present disclosure.

FIG. 7 is a flowchart of a method 700 for controlling a power circuit in accordance with an embodiment of the present disclosure. The power circuit includes a first power switch and a control circuit. The method 70 may be used to control the power circuit 100-600 as shown in FIG. 1-6.

The method includes the following actions. In action 710, the control circuit receives an input voltage signal and at least one control signal. In action 720, the control circuit provides a first driving signal to a control terminal of the first power switch in response to the input voltage signal and the at least one control signal, and the first power switch is turned on and off in response to the first driving signal. In action 730, the control terminal of the first power switch receives a first safety signal, and the first power switch is controlled in response to the first safety signal. In action 740, the power circuit provides an output voltage signal in response to the first driving signal and the first safety signal.

Although the flowchart of FIG. 7 shows a sequential actions. It is obvious to persons skilled the art that these actions could be performed in any order.

Based on the above, the present disclosure provides a power circuit achieves safety operation or safety turn-off by providing a safety signal through the safety pin to the control terminal of the power switch. As a result, the power circuit provides alternative path independent to the traditional control loop circuit to turn off the power switch. Even if malfunction occurs on the control circuit, the safety function circuit is able to operate normally to safely discharge the gate of the power switch. Furthermore, through the safety pin, the IC allows external circuits to directly control the power switch regardless of the state of IC. Moreover, the power circuit 310 adjusts the output voltage signal to control the operation of the load device to meet the ASIL requirement.

It will be appreciated by persons skilled in the art that the present disclosure is not limited to what has been particularly shown and described herein above. Rather the scope of the present disclosure is defined by the claims and includes both combinations and sub-combinations of the various features described hereinabove as well as variations and modifications thereof which would occur to persons skilled in the art upon reading the foregoing description and which are not in the prior art.

What is claimed is:

1. A power circuit, comprising:
   a first power switch having a first terminal, a second terminal and a control terminal;
   a control circuit configured to provide a first driving signal to the control terminal of the first power switch, wherein the first power switch is turned on and off in response to the first driving signal, wherein the control circuit is further configured to receive a safety command and control the first driving signal in response to the safety command, wherein the safety command includes a signal indicating an OFF state;
   an input pin configured to receive an input voltage signal;
   an output pin configured to provide an output voltage signal;
   at least one control pin, coupled to the control circuit and configured to receive at least one control signal; and
   a first safety pin coupled to the control terminal of the first power switch, wherein the first safety pin is configured to receive a first safety signal, and the first power switch is controlled in response to the first safety signal, wherein the first safety signal is configured turn off the first power switch.

2. The power circuit of claim 1, wherein the power circuit is further configured to adjust the output voltage signal to a load device to meet an automotive safety standard requirement of the load device in response to the first safety signal.

3. The power circuit of claim 1, further comprises:
   a safety function circuit configured to receive the safety command and provide the first safety signal in response to the safety command.

4. The power circuit of claim 3, wherein the control circuit is integrated on a first die and the safety function circuit is integrated on a second die.

5. The power circuit of claim 3, wherein the safety function circuit is further configured to: determine whether the first power switch is turned off and control the first safety signal to turn off the first power switch when it is determined that the first power switch is not turned off, in response to the safety command.

6. The power circuit of claim 1, further comprising:
   an off signal generating circuit configured to receive a safety shutdown signal, and provide the first safety signal to turn off the first power switch in response to the safety shutdown signal.

7. The power circuit of claim 6, wherein the off signal generating circuit comprises:
   a switch having a first terminal, a second terminal and a control terminal, wherein the first terminal of the switch is coupled to the control terminal of the first power switch, the second terminal of the switch is coupled to a reference voltage level, and the control terminal of the switch is configured to receive the safety shutdown signal;
   wherein when the safety shutdown signal is received, the switch is turned on to provide the reference voltage level to the control terminal of the first power switch.

8. The power circuit of claim 1, wherein the control circuit comprises:
   a gate driving control circuit coupled to the at least one control pin, wherein the gate driving control circuit is configured to provide a PWM control signal in response to the at least one control signal; and
   a driver configured to receive the PWM control signal, and provide the first driving signal to the control terminal of the first power switch in response to the PWM control signal;
   wherein the first safety pin is coupled to the control terminal of the first power switch via the driver, and the driver is further configured to adjust the first driving signal to control the first power switch in response to the first safety signal.

9. The power module of claim 1, wherein the control circuit is integrated on a first die and the first power switch is integrated on a second die.

10. The power circuit of claim 1, wherein the power circuit is a motor driver integrated circuit, and the power circuit further comprises:
    a second power switch having a first terminal, a second terminal and a control terminal, wherein the first terminal of the second power switch is coupled to the second terminal of the first power switch, the second terminal of the second power switch is coupled to a ground pin, and the control terminal of the second power switch is coupled to the control circuit for receiving a second driving signal, wherein the control circuit is further configured to control the second driving signal in response to the safety command; and
    a second safety pin coupled to the control terminal of the second power switch, wherein the second safety pin is configured to receive a second safety signal, wherein the second power switch is controlled in response to the second safety signal, and wherein the second safety signal is configured turn off the second power switch;

wherein the first terminal of the first power switch is coupled to the input pin, the second terminal of the first power switch is coupled to the output pin provide the output voltage signal to a motor; and wherein when the first safety signal and the second safety signal are received, the power circuit is further configured to adjust the output voltage signal to a motor.

11. The power circuit of claim 1, wherein the control circuit is further configured to: determine whether the first power switch is turned off and control the first driving signal to turn off the first power switch when it is determined that the first power switch is not turned off, in response to the safety command.

12. A method for controlling a power circuit, wherein the power circuit includes a first power switch and a control circuit, and the method comprises:

receiving an input voltage signal and at least one control signal;

providing a first driving signal to a control terminal of the first power switch in response to the input voltage signal and the at least one control signal, wherein the first power switch is turned on and off in response to the first driving signal;

receiving a safety command and controlling the first driving signal in response to the safety command by the control circuit, wherein the safety command includes a signal indicating an OFF state;

receiving a first safety signal by the control terminal of the first power switch, wherein the first power switch is controlled in response to the first safety signal, and wherein the first safety signal is configured turn off the first power switch; and providing an output voltage signal in response to the first driving signal and the first safety signal.

13. The method of claim 12, further comprising:
adjusting the output voltage signal to a load device to meet an ASIL requirement of the load device in response to the first safety signal.

14. The method of claim 12, further comprising:
receiving the safety command; and
providing the first safety signal in response to the safety command.

15. The method of claim 12, further comprising:
receiving a safety shutdown signal; and
providing the first safety signal to turn off the first power switch in response to the safety shutdown signal.

16. The method of claim 15, further comprising:
providing a PWM control signal, by a gate driving control circuit, in response to the at least one control signal, wherein the first driving signal is provided by a driver to the control terminal of the first power switch in response to the PWM control signal;
wherein the first safety signal is received by the driver and the first driving signal is adjusted to control the first power switch in response to the first safety signal.

17. The method of claim 12, wherein the power circuit further includes a second power switch, a first terminal of the first power switch is coupled to an input pin, a second terminal of the first power switch is coupled to an output pin, a first terminal of the second power switch is coupled to the second terminal of the first power switch, a second terminal of the second power switch is coupled to a ground pin, and the method further comprises:

providing a second driving signal to a control terminal of the second power switch in response to the input voltage signal and the at least one control signal;

controlling the second driving signal in response to the safety command by the control circuit; and receiving a second safety signal by the control terminal of the second power switch, wherein the second power switch is controlled in response to the second safety signal, and wherein the second safety signal is configured turn off the second power switch.

* * * * *